Patented May 5, 1936

2,039,898

UNITED STATES PATENT OFFICE 2,039,898

AZO-DYESTUFFS FOR DYEING LEATHER

Joseph Gyr, Basel, Switzerland, assignor to firm of Society of Chemical Industry in Basle, Basel, Switzerland No Drawing. Application January 15, 1935, Serial No. 1,964. In Switzerland November 24, 1934

7 Claims. (Cl. 260—12)

It has been found that azo-dyestuffs containing copper in complex union, which are constructed according to the following formula

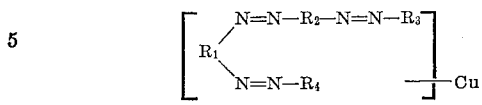

wherein $R_1$ represents the tetrazo-radical of diamino-diphenyl containing at least one sulfogroup, $R_2$ represents an aryl containing at least two hydroxyl-groups and capable of coupling twice, $R_3$ represents a radical of a diazo-compound containing lake-forming groups, and $R_4$ represents a radical of a coupling component, can be obtained by treating these azo-dyestuffs with agents yielding copper.

For constructing the azo-dyestuffs of the above formula there may be used as tetrazo-compound of a diamino-diphenyl ($R_1$) containing at least one sulfo-group, the tetrazo-compound of benzidine-mono- and di-sulfonic acids, for instance benzidine-2,2'-disulfonic acid, which may contain still further substituents, such as halogen, alkyl- or nitro-groups. As aryls ($R_2$) containing at least 2 hydroxyl groups and capable of coupling twice, may be named as examples, 1,3-dihydroxybenzenes and dihydroxynaphthalenes, such as 1,3-dihydroxybenzene itself or 1,3-dihydroxybenzene-4-carboxylic acid, 1,3-dihydroxybenzene-5-carboxylic acid, 1,2,3-trihydroxybenzene-5-carboxylic acid, 1,5-dihydroxynaphthalene, 2,6-dihydroxynaphthalene, as well as the sulfonic acids or nitro-, alkyl- or halogen substitution products thereof, so long as these are capable of coupling twice. As diazo-compounds ($R_3$) containing lake-forming groups there come into question the diazo-compounds of the benzene or naphthalene series which contain in ortho-position to the diazo-group a hydroxyl-, carboxyl-, alkoxy-group or the salicylic acid grouping. Such diazo-compounds are, for example, those of ortho-amino-phenols, ortho-amino-naphthols, ortho - amino-alkoxybenzenes, ortho-amino-alkoxynaphthalenes, anthranilic acids, ortho-amino-naphthalene-carboxylic acids, amino-salicylic acids, as well as the sulfonic acids, nitro-, alkyl- or halogen substitution products of these bodies. As coupling components ($R_4$) may be used any phenol or amine of the benzene or naphthalene series, as well as their sulfonic acids, nitro-, alkyl- and halogen substitution products and also azo-dyestuffs capable of coupling with diazo-components.

For building up the azo-dyestuffs of the above formula by action of the diazo-compound on the coupling component, any sequence of operations may be followed and, in accordance with the sequence selected, as well as the nature of the diazo-compound, the coupling may be conducted in a medium which is neutral, acid or alkaline, for example in a medium containing sodium carbonate, sodium bicarbonate, alkaline earth hydroxide, caustic alkali, ammonia, pyridine, acetic acid or hydrochloric acid. So also the conversion of the dyestuff into a copper compound may be conducted with the aid of various agents which yield copper, for example, copper sulfate, copper chloride, tetrammine-cupric sulfate, copper acetate, if desired in the presence of an organic base, for example, pyridine. The agent yielding copper may be allowed to act on an intermediate dyestuff containing a lake-forming group, or only on the finished polyazo-dyestuff; furthermore, the conversion into the copper compound may occur in the dye-bath or simultaneously with the production of the dyestuff.

The cupriferous dyestuffs obtained by the foregoing process dye leather tanned in any manner very varied tints, particularly brown: these dyeings are level and very fast.

The following examples illustrate the invention:—

Example 1

The diazo solution produced in usual manner from 189 parts of 1-hydroxy-2-aminobenzene-4-sulfonic acid is mixed at 5° C. with an alkaline solution of 110 parts of 1,3-dihydroxybenzene, and the monoazo-dyestuff thus formed converted in an acetic solution into the complex copper compound by boiling with a solution of 250 parts of crystallized copper sulfate. When cold the cupriferous dyestuff thus separated is dissolved with the necessary quantity of sodium carbonate, added at 5° C. to a tetrazo solution prepared from 344 parts of 4,4'-diaminodiphenyl-2,2'-disulfonic acid, 360 parts of hydrochloric acid of 30 per cent. strength, and 138 parts of sodium nitrite. The mixture is subsequently made alkaline by adding quickly a solution of 600 parts of soda-ash. As soon as, after a few minutes, the coupling to the disazo-dyestuff is complete an aqueous solution of 109 parts of 1-hydroxy-3-aminobenzene is added. The completely formed trisazo-dyestuff of the probable formula

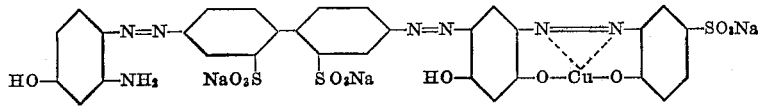

is separated by heating to 70° C. and salting out with common salt. When dry it represents a brown-black powder soluble in water to a yellowish-brown solution, and in concentrated sulfuric acid to a reddish-brown solution. It dyes leather tanned according to any method uniform yellow-brown tints of good fastness.

Example 2

When substituting in Example 1 the equivalent quantity of 1,3-diaminobenzene (108 parts) for

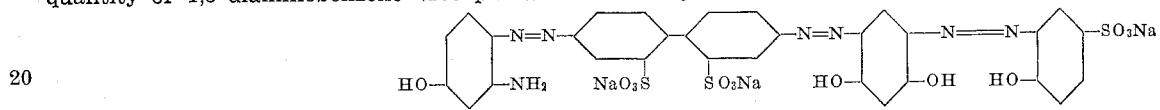

the 1-hydroxy-3-aminobenzene, the dyestuff thus obtained dyes vegetable-tanned and chrome-tanned leather uniform dark yellow-brown tints.

Example 3

When using in Example 1 as last coupling component 239 parts of 2-amino-8-hydroxy-naphthalene-6-sulfonic acid instead of 1-hydroxy-3-aminobenzene, there is obtained a dyestuff which dyes vegetable-tanned and chrome-tanned leather red-brown tints.

Example 4

Instead of 1-hydroxy-3-aminobenzene, as in Example 1, there is used here as last coupling component a solution rendered alkaline with sodium carbonate, of 388 parts of the monoazo-dyestuff further capable of coupling, which is obtained by diazotizing in usual manner 138 parts of 4-nitro-1-aminobenzene and mixing in an acid medium with 239 parts of 2-amino-8-hydroxy-naphthalene-6-sulfonic acid. There is obtained a dyestuff which dyes vegetable-tanned and chrome-tanned leather uniform dark red-brown tints, and which has probably the following formula

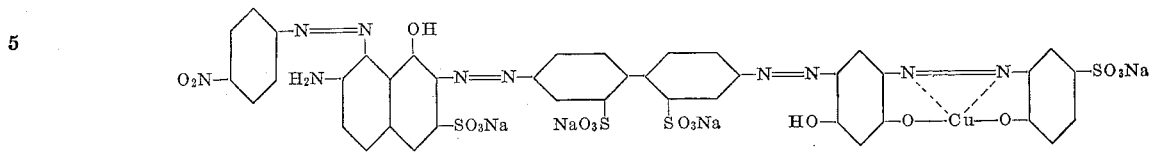

Example 5

Neutralized chrome leather (box calf, cow, goat, kid) is tumbled in a cask in 3–4 times its weight of water at 60° C. During the rotation of the cask there is introduced through the hollow axle a solution of the cupriferous dyestuff from the azo-dyestuff

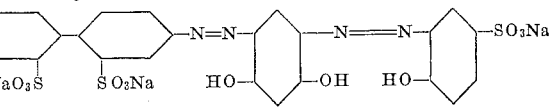

After about 40 minutes the dyestuff has been absorbed by the leather, which is then stuffed as usual.

The leather dyed in this manner has a level, full yellow-brown tint of good properties of fastness.

Example 6

Well fulled vegetable-tanned sheep or goat leather is dyed neutral as described in Example 5. At the end of the dyeing operation there is added formic acid amounting to half the weight of the dyestuff used, and dyeing is continued for 10–15 minutes. The leather is afterwards rinsed.

The leather dyed in this manner has the same tint as that of the leather dyed as described in Example 5.

The dyeing may also be conducted by the brush method in a neutral cold liquor.

The following table sets forth some of the tints obtainable, when applying the foregoing process, with the products obtained from the parent materials named in preparing the copper compound:—

| | Tetrazo-component R₁ | Azo-component R₂ | Diazo-component R₃ | Azo-component R₄ | Tint obtained with the copper compound |
|---|---|---|---|---|---|
| 1. | 4,4'-diaminodiphenyl-2,2'-disulfonic acid | 1,3-dihydroxy-benzene | 2-amino-1-hydroxybenzene-4-sulfonic acid | 1,3-dihydroxybenzene | Yellow brown |
| 2. | ___do___ | ___do___ | ___do___ | 1-methyl-2,4-diaminobenzene | Dark yellow-brown |
| 3. | ___do___ | ___do___ | ___do___ | 2-phenylamino-8-hydroxynaphthalene-6-sulfonic acid | Dark red brown |
| 4. | ___do___ | ___do___ | ___do___ | 1-amino-8-hydroxynaphthalene-3,6-disulfonic acid | Violet brown |
| 5. | ___do___ | ___do___ | ___do___ | 2-amino-5-hydroxynaphthalene-7-sulfonic acid | Yellow brown |
| 6. | ___do___ | ___do___ | ___do___ | 2-phenylamino-5-hydroxynaphthalene-7-sulfonic acid | Red brown |
| 7. | ___do___ | ___do___ | ___do___ | 2-amino-1-hydroxybenzene-4-sulfonic acid-azo-1,3-dihydroxybenzene | Yellow brown |
| 8. | ___do___ | ___do___ | ___do___ | 4-nitro-1-amino-benzene-azo-1-amino-8-hydroxy-naphthalene-3,6-disulfonic acid (acid coupled) | Dark brown |
| 9. | ___do___ | ___do___ | ___do___ | 2-amino-8-hydroxynaphthalene-6-sulfonic-acid-azo-1,3-diaminobenzene | Do. |
| 10. | ___do___ | ___do___ | ___do___ | 2-amino-8-hydroxynaphthalene-3,6-disulfonic acid | Red brown |
| 11. | ___do___ | ___do___ | 4-nitro-2-amino-1-hydroxybenzene | 1-hydroxy-3-aminobenzene | Dark yellow-brown |
| 12. | ___do___ | ___do___ | ___do___ | 1-methyl-2,4-diaminobenzene | Do. |
| 13. | ___do___ | ___do___ | ___do___ | 2-amino-8-hydroxynaphthalene-6-sulfonic acid | Red brown |
| 14. | ___do___ | ___do___ | ___do___ | 2-amino-5-hydroxynaphthalene-1,7-disulfonic acid | Do. |
| 15. | 4,4'-diamino-diphenyl-3-sulfonic acid | 1,3-dihydroxy-benzene-4-carboxylic acid | 2-amino-1-hydroxybenzene 4,6-disulfonic acid | 1,3-diamino-benzene-4-sulfonic acid | Dark yellow-brown |
| 16. | ___do___ | ___do___ | 2-amino-4,6-dinitro-1-hydroxybenzene | 1,3-dihydroxy-benzene | Red brown |
| 17. | ___do___ | ___do___ | 6-amino-1-hydroxy-2-carboxybenzene-4-sulfonic acid | 3-amino-1-hydroxybenzene | Yellow brown |

What I claim is:—

1. Azo-dyestuffs containing copper in complex union constructed according to the following general formula

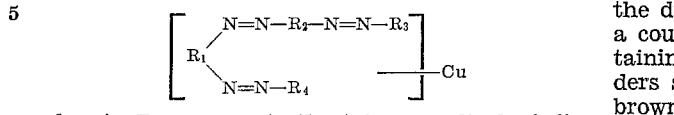

wherein $R_1$ represents the tetrazo radical of diamino diphenyl containing at least one sulfo-group, $R_2$ represents an aryl containing at least two hydroxyl-groups and capable of coupling twice, $R_3$ represents a radical of a diazo compound containing lake-forming groups, and $R_4$ represents a radical of a coupling component, which azo-dyestuffs containing copper in complex union represent powders soluble in water, and dye leather uniform brown tints of good fastness.

2. Azo-dyestuffs containing copper in complex union constructed according to the following general formula

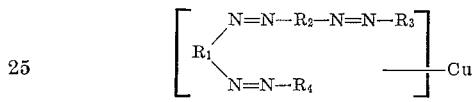

wherein $R_1$ represents the tetrazo radical of diamino diphenyl containing at least one sulfo-group, $R_2$ represents a radical of a benzene derivative containing at least two hydroxyl-groups and capable of coupling twice, $R_3$ represents a radical of a diazo compound containing lake-forming groups, and $R_4$ represents a radical of a coupling component, which azo-dyestuffs containing copper in complex union represents powders soluble in water, and dye leather uniform brown tints of good fastness.

3. Azo-dyestuffs containing copper in complex union constructed according to the following general formula

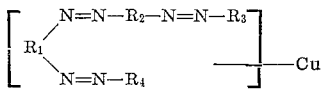

wherein $R_1$ represents the tetrazo radical of diamino diphenyl containing at least one sulfo-group, $R_2$ represents a radical of a benzene derivative containing at least two hydroxyl-groups and capable of coupling twice, $R_3$ represents a radical of a diazo compound containing a hydroxyl-group in ortho-position to the diazo-group, and $R_4$ represents a radical of a coupling component, which azo-dyestuffs containing copper in complex union represents powders soluble in water, and dye leather uniform brown tints of good fastness.

4. Azo-dyestuffs containing copper in complex union constructed according to the following general formula

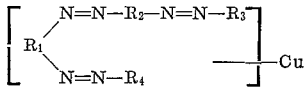

wherein $R_1$ represents the tetrazo radical of diamino diphenyl containing at least one sulfo-group, $R_2$ represents a radical of dihydroxy-benzene, $R_3$ represents a radical of a diazo compound containing a hydroxyl-group in ortho-position to the diazo-group, and $R_4$ represents a radical of a coupling component, which azo-dyestuffs containing copper in complex union represents powders soluble in water, and dye leather uniform brown tints of good fastness.

5. Azo-dyestuffs containing copper in complex union constructed according to the following general formula

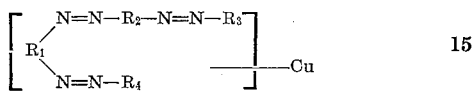

wherein $R_1$ represents the tetrazo radical of 4,4'-diamino-diphenyl-2,2'-disulfonic acid, $R_2$ represents a radical of dihydroxy-benzene, $R_3$ represents a radical of a diazo compound containing a hydroxyl-group in ortho-position to the diazo group, and $R_4$ represents a radical of a coupling component, which azo-dyestuffs containing copper in complex union represents powders soluble in water, and dye leather uniform brown tints of good fastness.

6. Azo-dyestuffs containing copper in complex union constructed according to the following general formula

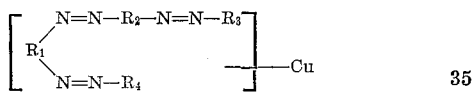

wherein $R_1$ represents the tetrazo radical of 4,4'-diamino-diphenyl-2,2'-disulfonic acid, $R_2$ represents a radical of 1,3-dihydroxybenzene, $R_3$ represents a radical of the diazo compound of an ortho-aminophenol, and $R_4$ represents a radical of a coupling component, which azo-dyestuffs containing copper in complex union represents powders soluble in water, and dye leather uniform brown tints of good fastness.

7. The azo-dyestuffs containing copper in complex union constructed according to the following general formula

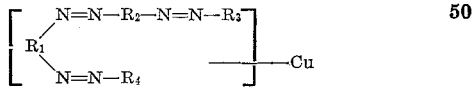

wherein $R_1$ represents the tetrazo radical of 4,4'-diamino-diphenyl-2,2'-disulfonic acid, $R_2$ represents a radical of 1,3-dihydroxybenzene, $R_3$ represents a radical of the diazo compound of 2-amino-1-phenol-4-sulfonic acid, and $R_4$ represents a radical of 1-amino-3-hydroxybenzene which azo-dyestuff containing copper in complex union represents a powder soluble in water, and dyes leather uniform yellow-brown tints of good fastness.

JOSEPH GYR.